United States Patent
Inagaki et al.

[11] Patent Number: 5,865,513
[45] Date of Patent: Feb. 2, 1999

[54] ANTILOCK BRAKE CONTROL PROCESS FOR VEHICLE

[75] Inventors: Hiromi Inagaki; Kazuhiko Mochizuki; Shinji Suto; Toshio Hayashi, all of Wako, Japan

[73] Assignee: Honda Giken Kogyo Kabushiki Kaisha, Tokyo, Japan

[21] Appl. No.: 660,408

[22] Filed: Jun. 7, 1996

[30] Foreign Application Priority Data

Jun. 9, 1995 [JP] Japan ..................................... 7-142957

[51] Int. Cl.$^6$ ....................................................... B60T 8/84
[52] U.S. Cl. ........................................... 303/146; 303/189
[58] Field of Search .................................. 303/146, 148, 303/188, 189, 155

[56] References Cited

U.S. PATENT DOCUMENTS 4,898,431  2/1990  Karnopp et al. .
5,341,297  8/1994  Zomotor et al. ..................... 303/146 X

FOREIGN PATENT DOCUMENTS

3919347 A1  2/1990  Germany .
63-87356    4/1988  Japan .
63-44101    9/1988  Japan .
2258198     2/1993  United Kingdom ................... 303/148

*Primary Examiner*—Peter M. Poon
*Attorney, Agent, or Firm*—Nikaido, Marmelstein, Murray & Oram LLP

[57] ABSTRACT

In an antilock brake control for a vehicle for individually regulating braking forces of left and right wheel brakes in accordance with a locking tendency of left and right wheels during braking of the vehicle, a steering angle, a vehicle speed and a yaw rate of the vehicle are detected. A reference yaw rate is determined based on the steering angle and the vehicle speed. When a locking tendency of only an outer wheel during turning of the vehicle, of the left and right wheels is detected during turning of the vehicle, the braking force for the outer wheel is regulated in accordance with the tendency of the outer wheel, and the braking force for an inner wheel during turning of the vehicle is regulated in accordance with a difference between the reference yaw rate and the detected actual yaw rate. Thus, it is possible to enhance the turning characteristic while avoiding a loss in total braking force during turning of the vehicle.

2 Claims, 7 Drawing Sheets

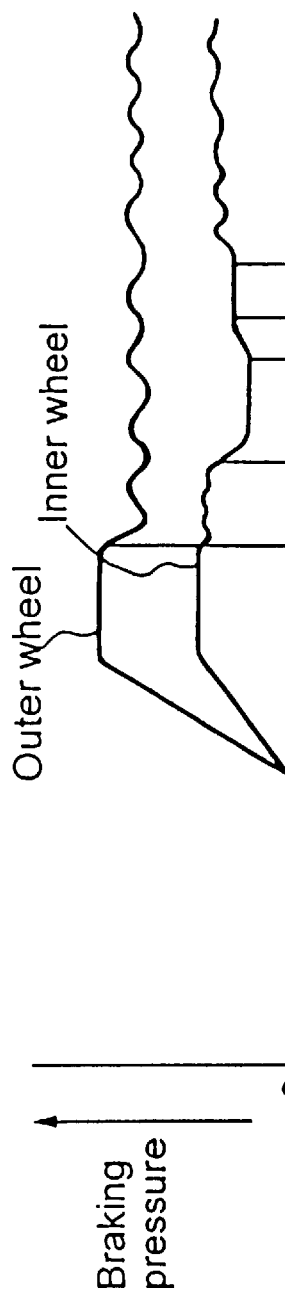
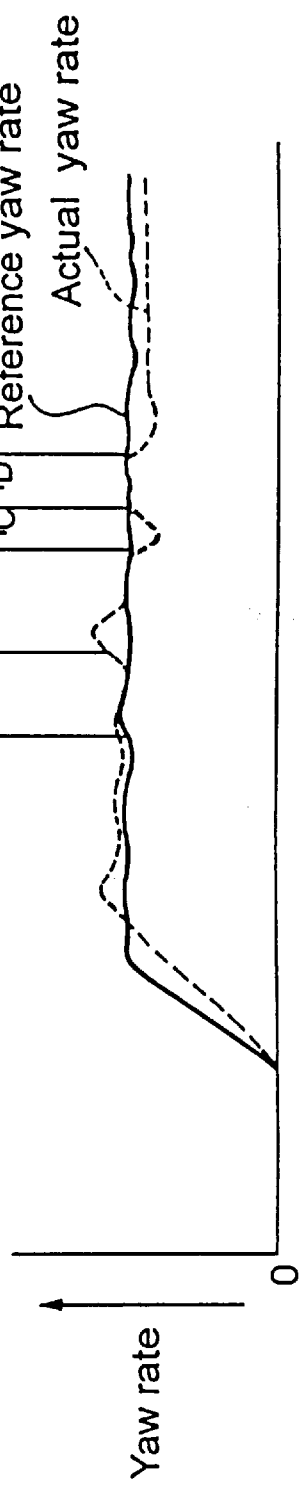
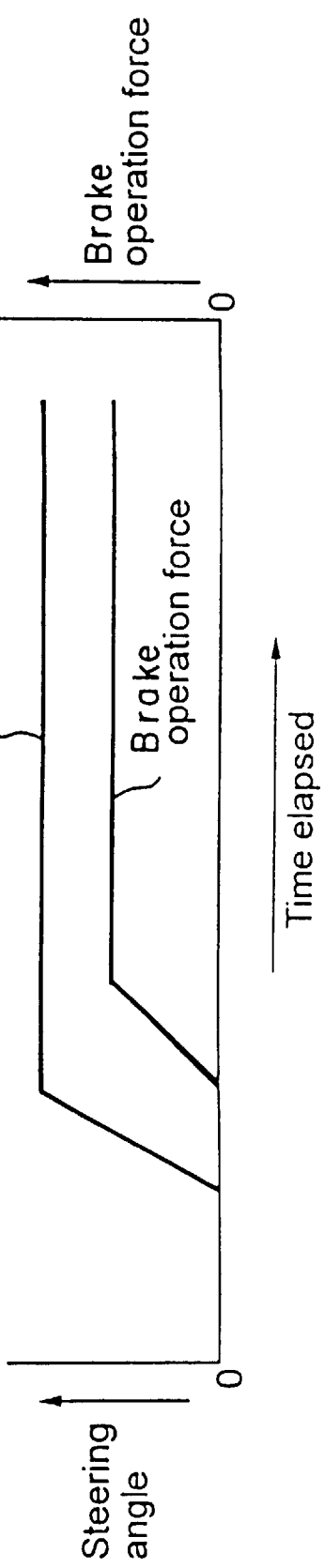
FIG. 7A
FIG. 7B
FIG. 7C

ANTILOCK BRAKE CONTROL PROCESS FOR VEHICLE

BACKGROUND OF THE INVENTION

1. Field of the Invention

The present invention relates to an antilock brake control process for a vehicle, for individually detecting locking tendency in a left wheel and a right wheel during braking, and individually regulating braking forces of a left wheel brake and a right wheel brake in accordance with the detected locking tendency in the wheels.

2. Description of the related Art

An antilock brake control process is conventionally known, for example, from Japanese Patent Publication No.63-44101 and Japanese Patent Application Laid-open No.63-87356. In the known antilock brake control process, however, when the locking tendency is produced in at least one of the left and right wheels, the braking pressure therefor is controlled such that the speed of the wheel, having the locking tendency produced therein, is made to coincide with a reference value based on a vehicle speed. Thus, it has not been considered to enhance the turning characteristic of the vehicle during the antilock brake control when the vehicle is being turned. However, when the vehicle is being turned, the load is increased on an outer wheel during turning of the vehicle, while the load is decreased in an inner wheel during turning of the vehicle. If a maximum braking force is insured for the outer wheel subjected to the larger load, a loss in total braking force can be suppressed even by regulating the turning level of the vehicle by the regulation of the braking pressure for the inner wheel.

SUMMARY OF THE INVENTION

Accordingly, it is an object of the present invention to provide an antilock brake control process for a vehicle, wherein the turning characteristic can be enhanced while avoiding a loss in total braking force during turning of the vehicle.

According to a first feature of the present invention, there is provided an antilock brake control process for a vehicle, for individually detecting a locking tendency of a left wheel and a right wheel during braking, and individually regulating braking forces of a left wheel brake and a right wheel brake in accordance with a detected locking tendency in the respective wheels. The process comprises the steps of: detecting a steering angle, a vehicle speed and a turning level of the vehicle; determining a target turning level based on the steering angle and the vehicle speed; and when a locking tendency is detected only in an outer wheel of the left and right wheels during turning of the vehicle, regulating the braking force for the outer wheel in accordance with the locking tendency of the outer wheel, and regulating the braking force for an inner wheel during turning of the vehicle in accordance with a difference between the target turning level and the detected actual turning level.

With the first feature, the braking force for the outer wheel, having an increased load, can be regulated in accordance with a locking tendency appearing in the outer wheel thereby to provide a maximum braking force for the outer wheel. Furthermore, the turning level can be regulated by regulating the braking force for the inner wheel, having a decreased load, in accordance with the difference between the target turning level and the detected actual turning level. Thus, it is possible to enhance the turning characteristic while avoiding a loss in total braking force.

According to a second feature of the invention, there is provided an antilock brake control process for a vehicle, for individually detecting a locking tendency in a left wheel and a right wheel during braking, and individually regulating braking forces of a left wheel brake and a right wheel brake in accordance with a detected locking tendency in the respective wheels. The process comprises the steps of: detecting a steering angle, a vehicle speed and a turning level of the vehicle; determining a target turning level based on the steering angle and the vehicle speed; and in an over-steered state when a locking tendency is detected at least in an inner wheel of the left and right wheels during turning of the vehicle, regulating the braking force for an outer wheel depending upon whether or not there is a locking tendency in the outer wheel, and regulating the braking pressure for the inner wheel to a value lower than a value determined by an antilock brake control in accordance with a difference between the target turning level and the detected actual turning level.

With the second feature, a maximum braking force that can be exhibited on the outer wheel side can be provided by regulating the braking force for the outer wheel having the increased load, depending upon whether or not the outer wheel has a locking tendency. For the inner wheel having the decreased load while having the locking tendency produced therein, the turning level can be regulated in a direction to eliminate the over-steered state by regulating the braking force for the inner wheel to a value lower than a value determined by the antilock brake control in accordance with the difference between the target turning level and the detected actual turning level. Thus, it is possible to enhance the turning characteristic while avoiding a loss in total braking force.

The above and other objects, features and advantages of the invention will become apparent from the following detailed description of a preferred embodiment of the present invention.

BRIEF DESCRIPTION OF THE DRAWINGS

FIG. 6 is a flow chart illustrating the remaining portion of the sub-routine for carrying out step S9 shown in FIG. 3; and FIG. 7 is a timing chart.

DETAILED DESCRIPTION OF THE PREFERRED EMBODIMENTS

Figure 1:
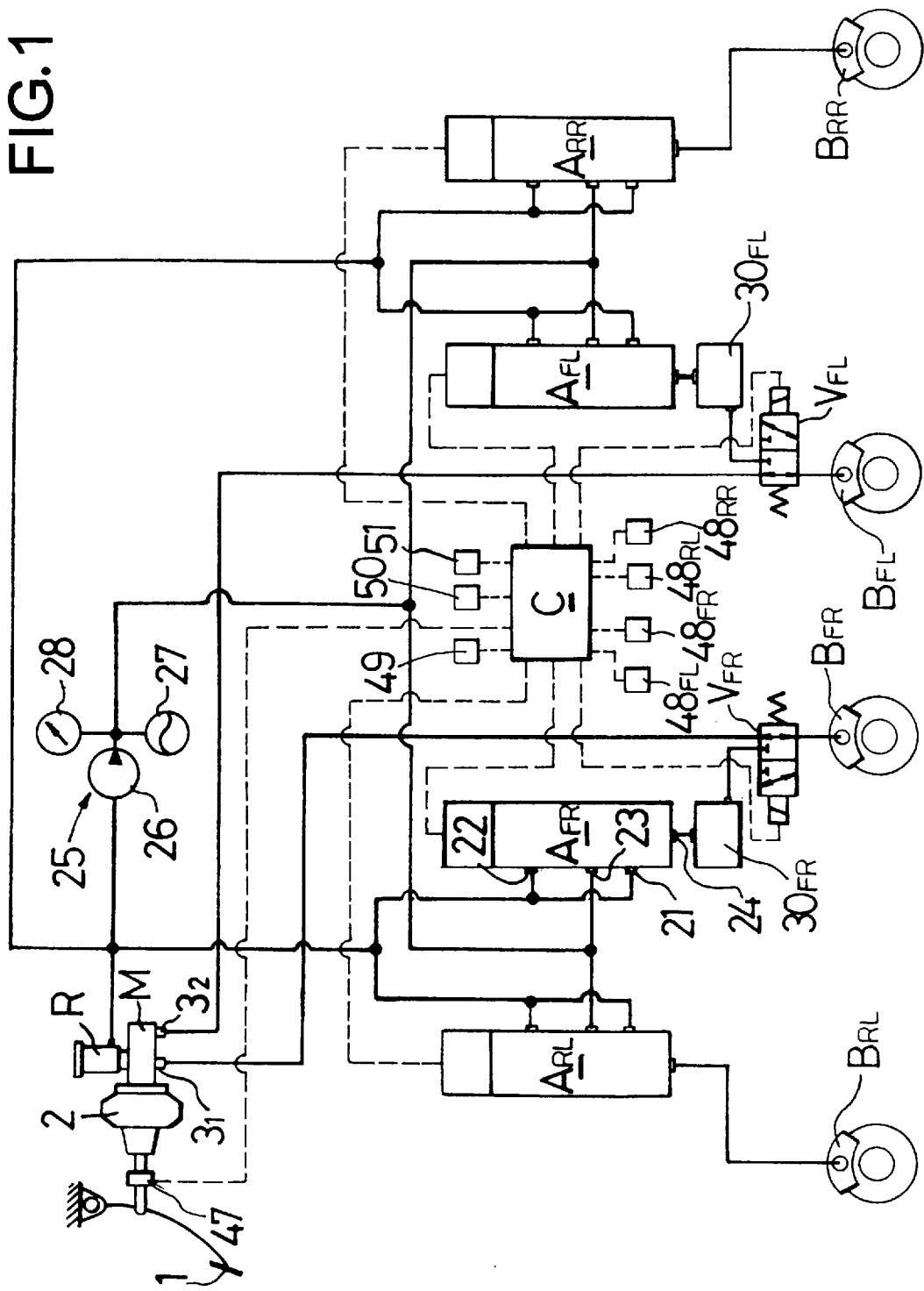
FIG. 1 is a diagrammatic illustration of a liquid pressure circuit of a brake system for a vehicle according to an embodiment of the present invention.

Referring first to FIG. 1, a left front wheel brake $B_{FL}$, a right front wheel brake $B_{FR}$, a left rear wheel brake $B_{RL}$ and a right rear wheel brake $B_{RR}$ are mounted on left and right front wheels and left and right rear wheels of a front-engine, front-drive vehicle, respectively. The left and right rear wheel brakes $B_{RL}$ and $B_{RR}$ are connected to actuators $A_{RL}$ and $A_{RR}$ each capable of outputting a liquid pressure corresponding to an electric command from a controller C. The left and right front wheel brakes $B_{FL}$ and $B_{FR}$ are connected to actuators $A_{FL}$ and $A_{FR}$, each capable of outputting a liquid pressure corresponding to an electric command from the controller C, and connected to a master cylinder M capable of outputting a liquid pressure depending upon a manual operation in an alternatively switched manner through electromagnetic switch-over valves $V_{FL}$ and $V_{FR}$, respectively.

The master cylinder M is of a tandem type. A braking operation force of a brake pedal 1 is input to the master cylinder M through a vacuum booster 2. A liquid pressure, depending upon the braking operation force, is output from first and second output ports $3_1$ and $3_2$ provided in the master cylinder M. The first output port $3_1$ is connected to the right front wheel brake $B_{FR}$ through the electromagnetic switch-over valve $V_{FR}$, and the second output port $3_2$ is connected to the left front wheel brake $B_{FL}$ through the electromagnetic switch-over valve $V_{FL}$.

Figure 2:
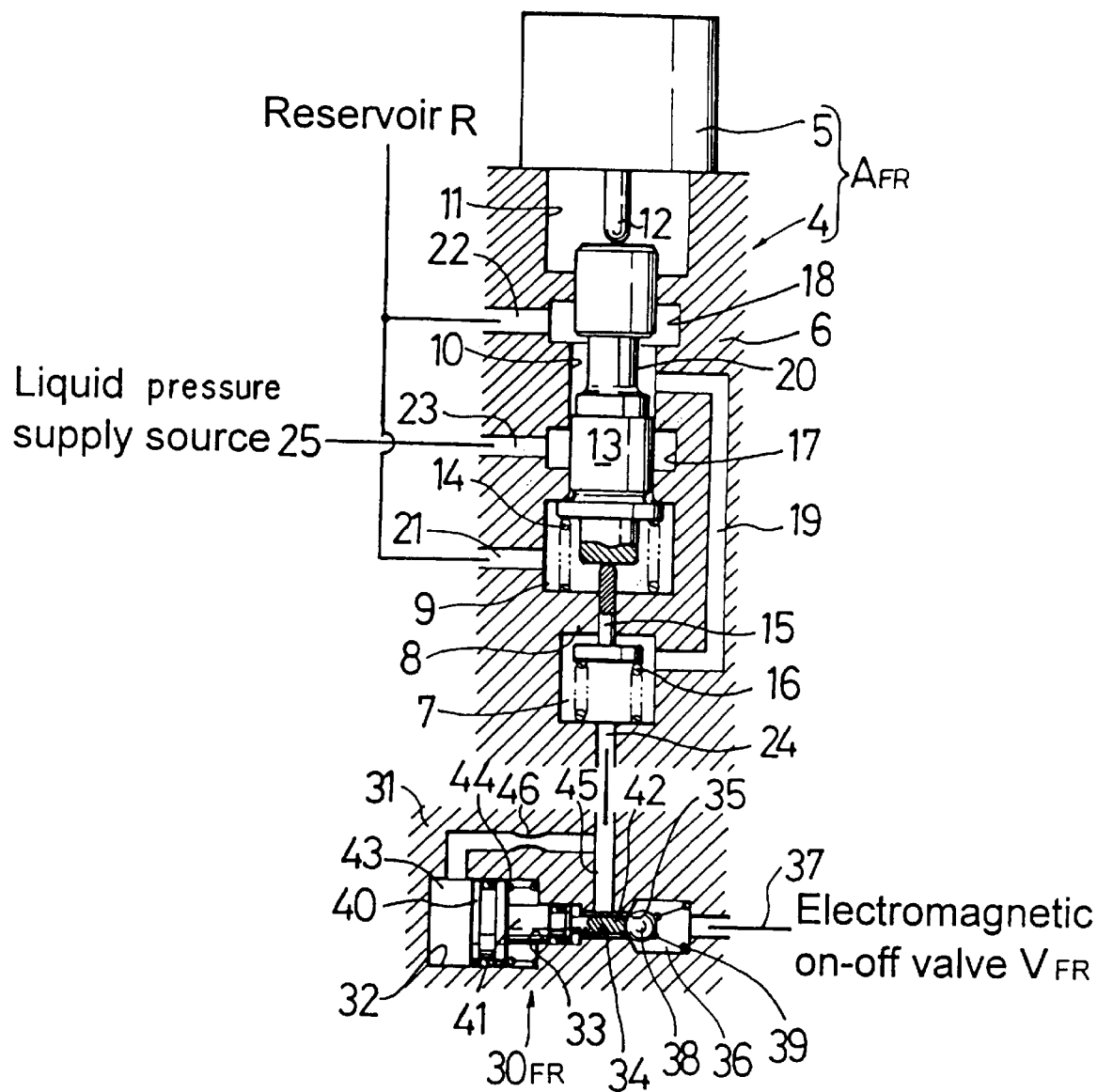
FIG. 2 is a sectional view illustrating the arrangements of an actuator and an on-off valve.

Referring to FIG. 2, the actuator $A_{FR}$ corresponding to the right front wheel brake BFR includes a control valve 4, and a linear solenoid 5.

The control valve 4 has a housing 6 which is provided with an output chamber 7, a release chamber 9 with a partition wall 8 interposed between the release chamber 9 and the output chamber 7, a slide bore 10 connected at one end to the release chamber 9, and an operating chamber 11 which has a diameter larger than that of the slide bore 10 and which is coaxially connected at one end to the other end of the slide bore 10 and opens at the other end thereof. The linear solenoid 5, including a driving rod 12, is mounted to the housing 6 in such a manner that the driving rod 12 is coaxially disposed within the operating chamber 11 to close an outer end of the operating chamber 11.

A valve spool 13 is slidably received in the slide bore 10 and has one end which faces the release chamber 9. A return spring 14 is compressed between one end of the valve spool 13 and the partition wall 8. Thus, the valve spool 13 is biased by a spring force of the return spring 14, so that the other end thereof is normally in abutment against the driving rod 12.

A reaction pin 15, formed into a diameter smaller than that of the valve spool 13, is liquid-tightly and slidably passed through the partition wall 8. A spring 16 is compressed between one end of the reaction pin 15 facing the output chamber 7 and the housing 6 for exhibiting a small spring force since it normally brings the other end of the reaction pin 15 into abutment against one end of the valve spool 13.

A first annular recess 17 adjacent the release chamber 9 and a second annular recess 18 adjacent the operating chamber 11 are provided at an axial distance from each other in the slide bore 10. A communication passage 19 is provided in the housing 6 between the first and second annular recesses 17 and 18 and opens at its one end into an inner surface of the slide bore 10. The other end of communication passage 19 communicates with the output chamber 7. An annular groove 20 is provided in an outer periphery of the valve spool 13. When the valve spool 13 is in a retreated position as shown in FIG. 2, the annular groove 20 allows the second annular recess 18 to communicate with the communication passage 19, while allowing the first annular recess 17 to be out of communication with the communication passage 19. When the valve spool 13 has been advanced, the annular groove 20 permits the first annular recess 17 to communicate with the communication passage 19, while allowing the second annular recess 18 to be out of communication with the communication passage 19.

Provided in the housing 6 are a) first and second release ports 21 and 22 which lead to the released chamber 9 and the second annular recess 18, respectively, b) an input port 23 leading to the first annular recess 17, and c) an output port 24 leading to the output chamber 7. As shown in FIG. 1, the first and second release ports 21 and 22 communicate with a reservoir R mounted on the master cylinder M, and the input port 23 communicates with a liquid pressure supply source 25.

The liquid pressure supply source 25, shown in FIG. 1, includes a pump 26 for pumping a working liquid from the reservoir R, an accumulator 27 connected to the pump 26, and a pressure detector 28 for detecting a pressure in the accumulator 27. The liquid pressure supply source 25 is capable of normally supplying a given liquid pressure.

The linear solenoid 5, shown in FIG. 2, applies an axial thrust force corresponding to the electric command input from the controller C to the valve spool 13 from the driving rod 12. The valve spool 13 is urged in a direction to bring the communication passage 19 and thus the output chamber into communication with the first annular recess 17 and thus the input port 23 by the axial thrust force from the linear solenoid 5. A spring force opposing the axial thrust force is applied to the valve spool 13 by the return spring 14, and a reaction force from the reaction pin 15 is applied to the valve spool 13 to oppose the axial thrust force, by application of a liquid pressure in the output chamber 7 to the reaction pin 15. In this manner, the valve spool 13 is moved within the slide bore 10 between a retreated position in which it permits the output chamber 7 and thus the output port 24 to communicate with the second annular recess 18 and thus the second release port 23, and an advanced position in which it permits the output port 24 to communicate with the input port 23, whereby a braking liquid pressure depending upon an input quantity of electricity of the linear solenoid is output from the output port 24.

The output port 24 in the actuator $A_{FR}$ is connected to the electromagnetic switch-over valve $V_{FR}$ through an on-off valve $30_{FR}$. The electromagnetic switch-over valve $V_{FR}$ is alternatively switched between a state in which the first output port $3_1$ in the master cylinder M is connected to the right front wheel brake $B_{FR}$ upon deenergization thereof, and a state in which the on-off valve $30_{FR}$ is connected to the right front wheel brake $B_{FR}$ upon energization thereof.

Provided in a valve housing 31 of the on-off valve $30_{FR}$ are a large-diameter slide bore 32 closed at one end, a small-diameter slide bore 33 having a diameter smaller than that of the large-diameter slide bore 32 and coaxially connected at one end to the other end of the large-diameter slide bore 32, a valve bore 34 having a diameter smaller than that of the small-diameter slide bore 33 and coaxially connected at one end to the other end of the small-diameter slide bore 33, and a valve chamber 36 connected to the other end of the valve bore 34. A tapered valve seat 35 is formed between the valve bore 34 and the valve chamber 36, and the other end of the valve bore 34 opens into a central portion of the valve seat 35.

A pipe line 37 connected to the electromagnetic switch-over valve $V_{FR}$ is connected to the valve chamber 36. Accommodated in the valve chamber 36 are a valve sphere 38 which is capable of being seated on the valve seat 35, and a spring 39 for biasing the valve sphere 38 in a direction to seat it onto the valve seat 35.

A large-diameter piston 40 is liquid-tightly and slidably received in the large-diameter slide bore 32 to form a pilot chamber 43 between the piston 40 and a closed portion at one end of the large-diameter slide bore 32. A small-diameter piston 41 is integrally connected to the large-diameter piston 40 and liquid-tightly and slidably received in the small-diameter slide bore 33. Moreover, a rod 42 is loosely inserted into the valve bore 34, and is coaxially and integrally connected at one end to the small-diameter piston 41, or coaxially abuts at one end against the small-diameter piston 41. The other end of the rod 42 is capable of abutting against the valve sphere 38. A spring 44 is compressed between a stepped portion between the large-diameter slide bore 32 and the small-diameter slide bore 33 in the valve housing 31 and the large-diameter piston 40.

A passage 45 is also provided in the valve housing 31 and leads to the output port 24 in the actuator $A_{FR}$. The passage 45 opens into an inner surface of an intermediate portion of the valve bore 34 and communicates with the pilot chamber 43 through a constriction 46.

In the on-off valve $30_{FR}$ having such a construction, if a liquid pressure equal to or larger than a predetermined value is output from the output port 24 in the actuator $A_{FR}$, the large-diameter piston 40 is moved by the liquid pressure in the pilot chamber 43 in a direction to increase the volume of the pilot chamber 43 against the spring force of the spring 44, so that the valve sphere 38 is urged by the rod 42 away from the valve seat 35, thereby opening the on-off valve $30_{FR}$. If the output liquid pressure from the output port 24 in the actuator $A_{FR}$ is lower than the predetermined value, then the large-diameter piston 40 is moved by the spring force of the spring 44 in a direction to decrease the volume of the pilot chamber 43, so that the rod 42 is moved to cause the valve sphere 38 to be seated onto the valve seat 35, thereby closing the on-off valve $30_{FR}$. Moreover, the reduction in liquid pressure in the pilot chamber 43 can be retarded with respect to the reduction in liquid pressure in the passage 45 by the constriction 46. Thus, the on-off valve $30_{FR}$ is closed after the liquid pressure in the passage 45 has been reduced, and no remaining pressure is left in the valve chamber 36.

The actuator $A_{FL}$ corresponding to the left front wheel brake $B_{FL}$ is constructed in the same manner as the actuator $A_{FR}$, and connected to the electromagnetic switch-over valve $V_{FL}$ through the on-off valve $30_{FL}$ of a construction similar to that of the above-described on-off valve $30_{FR}$. The actuators $A_{RL}$ and $A_{RR}$ individually corresponding to the left and right rear wheel brakes $B_{RL}$ and $B_{RR}$ are also constructed in the same manner as the actuator $A_{FR}$.

The operation of the actuators $A_{FL}$, $A_{FR}$, $A_{RL}$ and $A_{RR}$ and the switching operation of the electromagnetic switch-over valves $V_{FL}$ and $V_{FR}$ are controlled by the controller C. Detection values detected by the following detectors are input into the controller C: an operation force detector 47; wheel speed detectors $48_{FL}$, $48_{FR}$, $48_{RL}$ and $48_{RR}$ for detecting wheel speeds of left and right front and left and right rear wheels, respectively; a longitudinal acceleration or deceleration detector 49 for detecting a longitudinal acceleration or deceleration of the vehicle; a lateral acceleration or deceleration detector 50 for detecting a lateral acceleration or deceleration of the vehicle; a steering angle detector 51 for detecting a steering angle; and the like. The controller C controls the actuators $A_{FL}$, $A_{FR}$, $A_{RL}$ and $A_{RR}$ and the electromagnetic switch-over valves $V_{FL}$ and $V_{FR}$ based on these detection values.

In such a brake system, during normal braking by depression of the brake pedal 1, the electromagnetic switch-over valves $V_{FL}$ and $V_{FR}$ remain deenergized, and the left and right front wheel brakes $B_{FL}$ and $B_{FR}$ are in their states in which they have been connected to the master cylinder M. Therefore, a liquid pressure output from the master cylinder M is applied to the left and right front wheel brakes $B_{FL}$ and $B_{FR}$ in accordance with an amount of depression of the brake pedal 1.

During normal braking with the master cylinder M connected to the left and right front wheel brakes $B_{FL}$ and $B_{FR}$ by the electromagnetic switch-over valves $V_{FL}$ and $V_{FR}$ in the above manner, the actuators $A_{FL}$ and $A_{FR}$ corresponding to the left and right front wheel brakes $B_{FL}$ and $B_{FR}$ are in their non-operated states. For this reason, the output ports 24 in the actuators $A_{FL}$ and $A_{FR}$ are in communication with the reservoir R, and the output liquid pressures from the actuators $A_{FL}$ and $A_{FR}$ are lower than a predetermined value. As a result, the on-off valves $30_{FL}$ and $30_{FR}$ are in closed states. Therefore, even if a sealing failure or the like is produced in the electromagnetic switch-over valves $V_{FL}$ and $V_{FR}$, the operating liquid cannot leak from the wheel brakes $B_{FL}$ and $B_{FR}$ or the master cylinder M toward the actuators $A_{FL}$ and $A_{FR}$.

When locking of one of the left and right front wheels is possible, e.g., the right front wheel is locked during the above-described braking, the electromagnetic switch-over valve $V_{FR}$, which corresponds to the right front wheel, is energized to cut-off the communication between the right front wheel brake $B_{RF}$ and the master cylinder M and at the same time, to connect the right front wheel brake $B_{FR}$ to the on-off valve $30_{FR}$. In addition, an electric command value for carrying out an antilock brake control is applied from the controller C to the actuator $A_{FR}$. When a liquid pressure is thereby output from the actuator $A_{FR}$, the on-off valve $30_{FR}$ is opened, thereby permitting the output liquid pressure from the actuator $A_{FR}$ to be applied to the right front wheel brake $B_{FR}$. When locking of the left front wheel is possible, the electromagnetic switch-over valve $V_{FL}$ corresponding to the left front wheel is energized, and an electric command value for carrying out the antilock brake control is supplied from the controller C to the actuator $A_{FL}$, so that a liquid pressure is output from the actuator $A_{FL}$. This causes the on-off valve $30_{FL}$ to be opened, thereby permitting the output liquid pressure from the actuator $A_{FL}$ to be applied to the left front wheel brake $B_{FL}$. Further, when locking of both the left and right wheels is possible, both the electromagnetic switch-over valves $V_{FL}$ and $V_{FR}$ are energized and eventually, the output pressures from the actuators $A_{FL}$ and $A_{FR}$ are applied to the left and right front wheel brakes $B_{FL}$ and $B_{FR}$, respectively.

Output pressures from the actuators $A_{RL}$ and $A_{RR}$ are applied to the left and right rear wheel brakes $B_{RL}$ and $B_{RR}$, respectively. Braking forces of the left and right rear wheel brakes $B_{RL}$ and $B_{RR}$, i.e., the output pressures from the actuators $A_{RL}$ and $A_{RR}$ are controlled in the following manner by the controller C according to a control procedure shown in FIG. 3.

Figure 3:
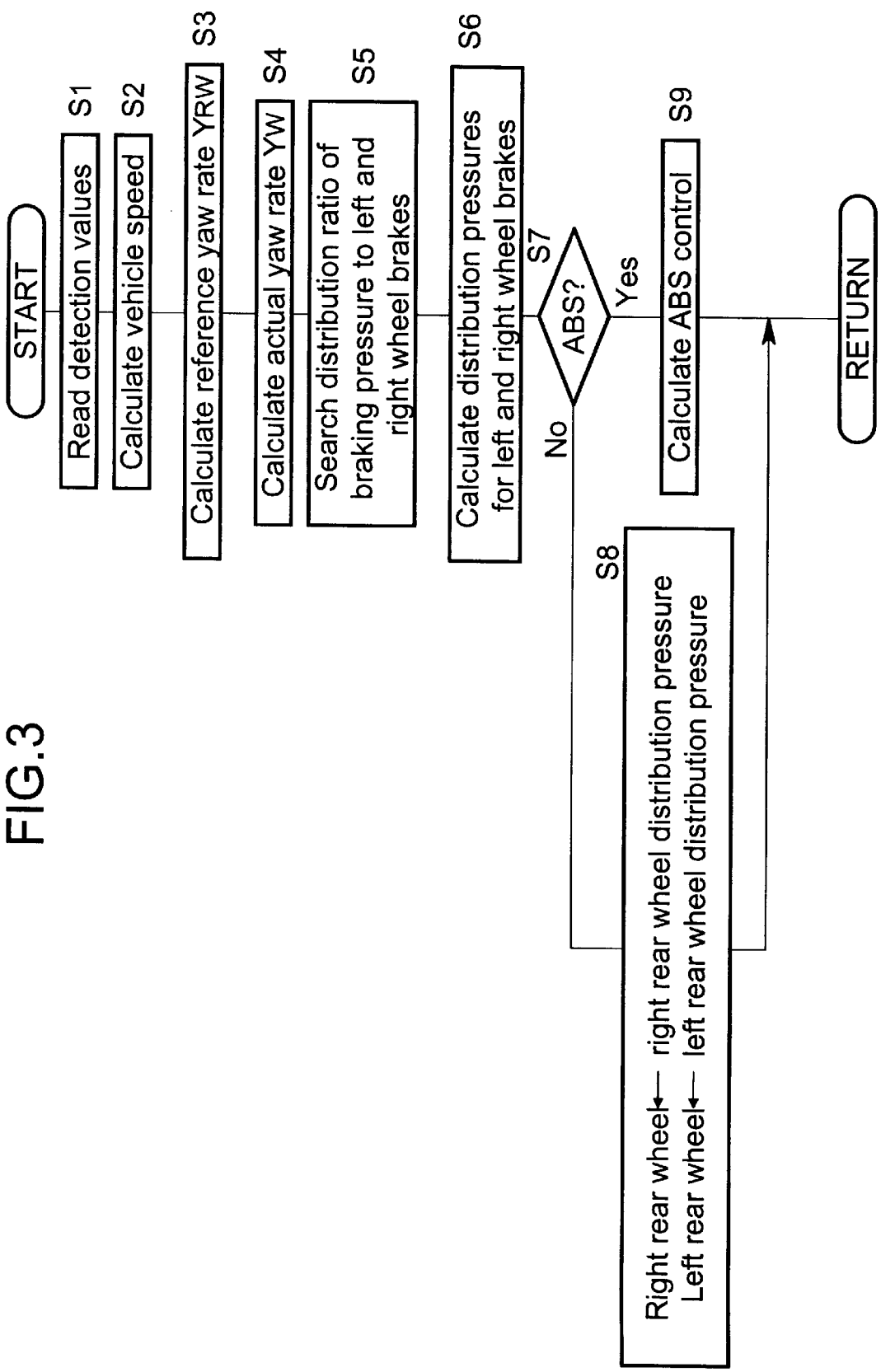
FIG. 3 is a flow chart illustrating a procedure for controlling the braking pressures for left and right rear wheels.

Referring to FIG. 3, at step S1, detection values detected by the operation force detector 47, the wheel speed detectors $48_{FL}$, $48_{FR}$, $48_{RL}$ and $48_{RR}$ the longitudinal acceleration or deceleration detector 49, the lateral acceleration or deceleration detector 50, the steering angle detector 51 and the like are read. Then, at step S2, calculation of a vehicle speed is carried out. Basically, the vehicle speed is evaluated based on the wheel speeds of the left and right rear wheels which are follower wheels. However, during speed-reduction, the vehicle speed is evaluated based on the assumption that the vehicle speed with an initial value provided by the follower wheel speeds at the start of speed-reduction is reduced by a value equal to a detection value detected by the longitudinal acceleration or deceleration detector 49 multiplied by a calculation cycle in every calculation during the speed-reduction.

At step S3, a reference yaw rate $Y_{RW}$ which is a target turning level, is calculated in the following manner based on the vehicle speed determined at step S2 as well as the steering angle determined in the steering angle detector 51. The reference yaw rate $Y_{RW}$ is a criterion value which is standard for a yaw rate to be generated when the driver steers through a steering angle at a low vehicle speed. The reference yaw rate $Y_{RW}$ is determined based on the vehicle speed and the steering angle. Moreover, the reference yaw rate $Y_{RW}$ is calculated to assume a plus value during rightward turning of the vehicle. At step S4, an actual yaw rate $Y_W$ which is an actual turning level is determined by multiplying a difference between the left and right follower wheel speeds by a predetermined constant corresponding to a tread of the left and right follower wheels. Such an actual yaw rate $Y_W$ is also determined to assume a plus value during rightward turning of the vehicle.

Figure 4:
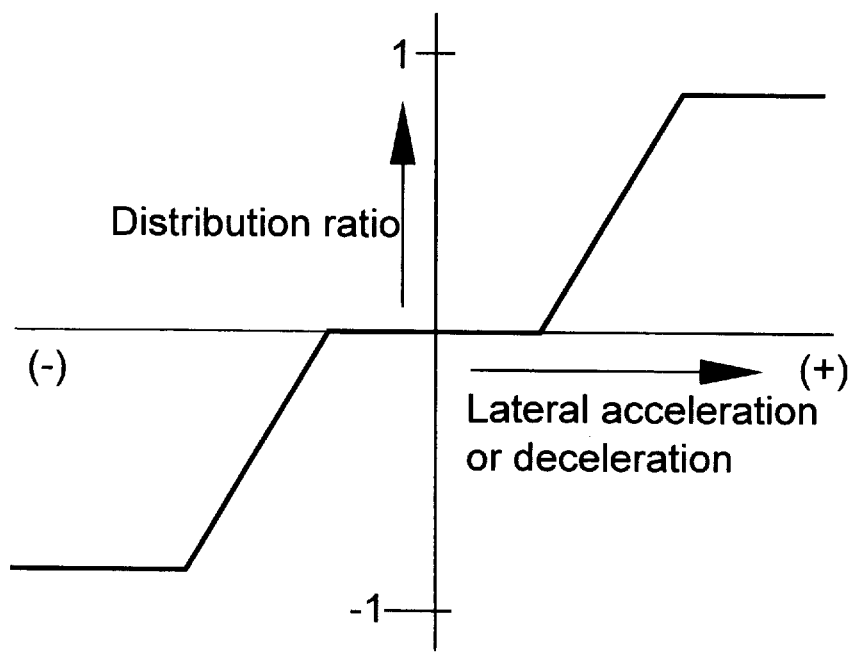
FIG. 4 is a diagram illustrating a pre-established map for a braking pressure distribution ratio according to lateral acceleration or deceleration.

At step S5, a braking pressure distribution ratio for the left rear wheel brake $B_{RL}$ and the right rear wheel brake $B_{RR}$ is searched in accordance with the lateral acceleration or deceleration, based on a pre-established map shown in FIG. 4. In this case, it is supposed that the lateral acceleration or deceleration detector 50 is mounted on the vehicle to provide a plus value (an acceleration) during rightward turning of the vehicle and to provide a minus value (a deceleration) during leftward turning of the vehicle. At step S6, braking distribution pressures for the left and right rear wheel brakes $B_{RL}$ and $B_{RR}$ are calculated according to the braking pressure distribution ratio determined at step S5. More specifically, on the basis of the reference pressure determined based on the operation force determined in the operation force detector 47, a braking pressure is determined as:

braking pressure for left rear wheel brake $B_{RL}$=reference pressure x (1−distribution ratio), and braking pressure for right rear wheel brake $B_{RR}$=reference reference pressure x (1+distribution ratio).

At step S7, it is determined whether the antilock brake (ABS) control, which is to be conducted as a result of at least one of the left and right rear wheels being about to be locked, should be carried out. If NO is determined at step S7, the processing is advanced to step S8, at which the braking pressures of the left and right rear wheel brakes $B_{RL}$ and $B_{RR}$ are set at the distribution pressures determined at step S6.

Figure 5:
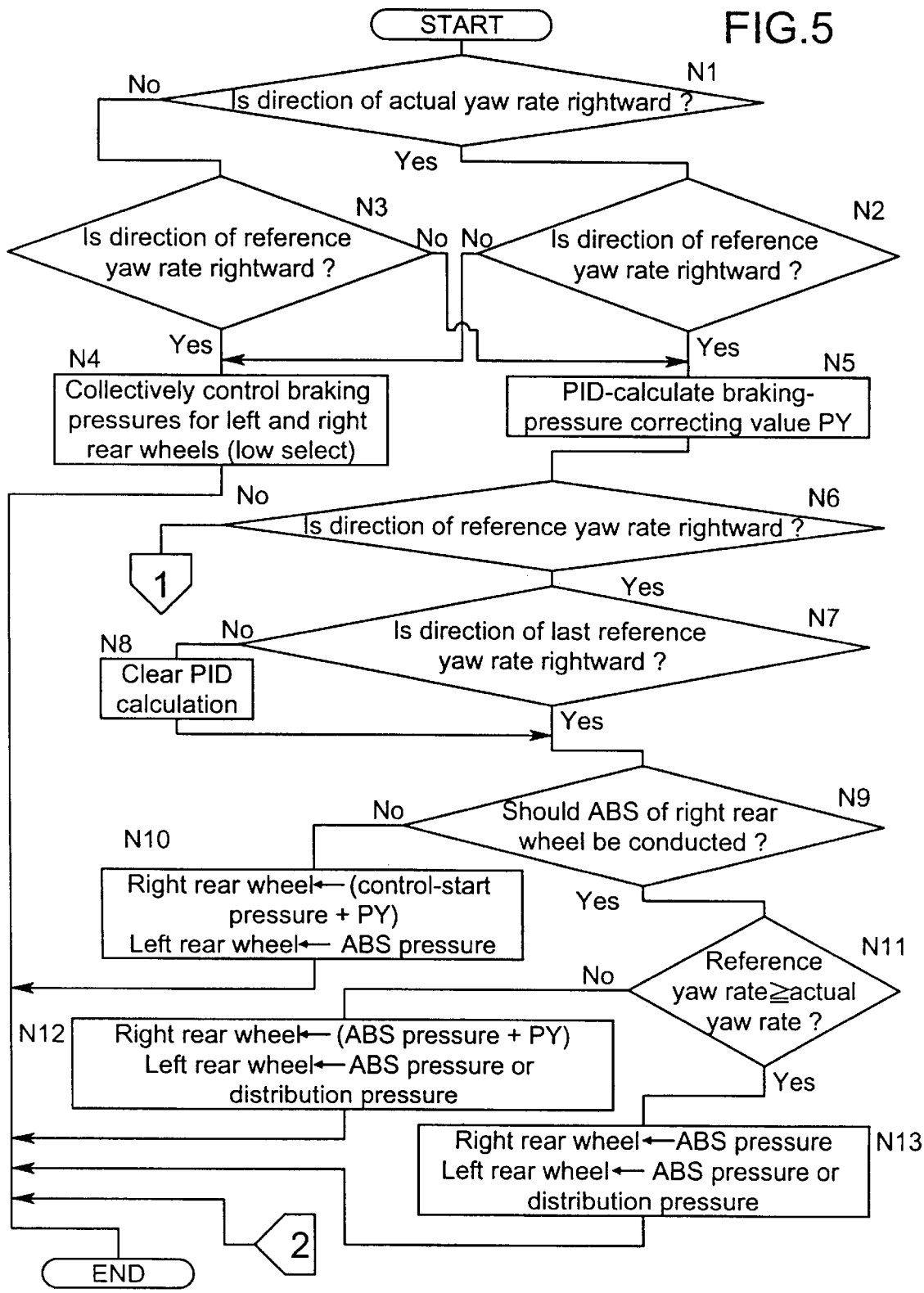
FIG. 5 is a flow chart illustrating a portion of a sub-routine for carrying out step S9 shown in FIG. 3.

On the other hand, an ABS control calculation is carried out at step S9 according to a sub-routine shown in FIGS. 5 and 6. At step N1 in FIG. 5, it is determined whether the direction of the actual yaw rate $Y_W$ is rightward (which means a plus value). At steps N2 and N3, it is determined whether the direction of the reference yaw rate $Y_{RW}$ is rightward (which means a plus value). Thus, the determinations at steps N1, N2 and N3 determine whether the direction of the actual yaw rate $Y_W$ coincides with the steering direction, i.e., the direction of the reference yaw rate $Y_{RW}$. If both directions do not coincide with each other, the processing is advanced to step N4. If both directions coincide with each other, the processing is advanced to step N5.

At step N4, processing is carried out for the case where the direction of actual yaw rate and the steering direction do not coincide with each other, i.e., the braking pressures of the left and right rear wheel brakes $B_{RL}$ and $B_{RR}$ are collectively controlled by a low select control.

At and after step N5, the processing is carried out when the direction of yaw rate and the steering direction coincide with each other. Namely, braking pressures individually controlled for the left and right rear wheel brakes $B_{RL}$ and $B_{RR}$ are determined at and after step N5.

At step N5, a PID calculation of a braking-pressure correcting value $P_Y$ is carried out according to the following equations:

$$P_Y(k)=K_{YP} \cdot P_Y(k)+K_{YI} \cdot I_Y(I)+K_{YD} \cdot D_{YD}(k)$$

$$P_Y(k)=Y_{RW}(k)-Y_W(k-1)$$

$$I_Y(k)=P_Y(k)+I_Y(k-1)$$

$$D_Y(k)=P_Y(k)-P_Y(k-1)$$

wherein each of $K_{YP}$, $K_{YI}$ and $K_{YD}$ is a gain constant.

At step N6, it is determined whether the direction of the reference yaw rate $Y_{RW}$ is rightward, i.e., whether the vehicle is being turned rightwardly. If the direction of the reference yaw rate $Y_{RW}$ is rightward, it is determined at step N7 whether the direction of the last reference yaw rate $Y_{RW}$ has been rightward. If the direction of the last reference yaw rate $Y_{RW}$ has been also rightward, the PID calculation at step N5 is cleared at step N8, proceeding to step N9. In other words, when the vehicle is being turned rightwardly, the processing is advanced to step N9.

At step N9, it is determined whether the right rear wheel which is an inner wheel of the left and right rear wheels during turning of the vehicle is about to be locked, i.e., whether the antilock brake control of the right rear wheel should be conducted. If the right rear wheel is in a state in which it is not about to be locked, i.e., only the left rear wheel which is an outer wheel during turning of the vehicle is about to be locked, namely, the antilock brake control of the left rear wheel $B_{RL}$ should be conducted, the processing is advanced to step N10.

At step N10, the braking pressure of the right rear wheel brake $B_{RR}$ which is the brake for the inner wheel during turning of the vehicle is set as a value provided by adding the braking-pressure correcting value PY to a control-start pressure which is a braking pressure at the start of the antilock brake control. In other words, when only the outer wheel is about to be locked, a value provided by correcting the braking pressure of the inner wheel by a correcting value PY determined depending upon a difference between the reference yaw rate $Y_{RW}$ which is a target turning level and the actual yaw rate $Y_W$ which is an actual turning level. Because the vehicle is being turned rightwardly, each of the reference yaw rate $Y_{RW}$ and the actual yaw rate $Y_W$ should show a plus value. When the reference yaw rate $Y_{RW}$>the actual yaw rate $Y_W$, i.e., in an under-steered state, the correcting value PY is a plus value and hence, the braking pressure of the right rear wheel brake $B_{RR}$ is increased up to a level higher than the control-start pressure. When the reference yaw rate $Y_{RW}$<the actual yaw rate $Y_W$, i.e., in an over-steered state, the correcting value PY is a minus value and hence, the braking pressure of the right rear wheel brake $B_{RR}$ is decreased down to a level lower than the control-start pressure.

On the other hand, the braking pressure of the outer wheel, during turning of the vehicle, which should be subjected to the antilock brake control, i.e., the left rear wheel brake $B_{RL}$, is an ABS pressure. If the control-start pressure is represented by $P_{BR}$, the ABS pressure $P_{ABS}$ is determined according to the following equations:

$$P_{ABS}(k)=P_{BR}(k)-PV(k)$$

$$PV(k)=K_{VP} \cdot P_V(k)+K_{VI} \cdot I_V(I)+K_{VD} \cdot D_V(k)$$

$$P_V(k)=V_R(k)-V_W(k-1)$$

$$I_V(k)=P_V(k)+I_V(k-1)$$

$$D_V(k)=P_V(k)-P_V(k-1)$$

wherein $V_R$ (k) is a vehicle speed; $V_W$ (k) is a wheel speed; and each of $K_{VP}$, $K_{VI}$ and $K_{VD}$ is a gain constant.

If it is determined at step N9 that the right rear wheel is about to be locked, i.e., the antilock brake control of at least the right rear wheel brake $B_{RR}$ which is the inner wheel during turning of the vehicle is to be conducted, it is determined at step N11 whether the reference yaw rate is equal to or greater than the actual yaw rate. If it is determined that the vehicle is in a state in which the reference yaw rate is smaller than the actual yaw rate, i.e., in an over-steered state, the processing is advanced to step N12. If it is determined that the vehicle is in a state in which the reference yaw rate is equal to or greater than the actual yaw rate, i.e., in an under-steered state, the processing is advanced to step N13.

At step N12 to be conducted when the vehicle is in the over-steered state, the braking pressure of the right rear wheel brake $B_{RR}$ which is the brake of the inner wheel during turning of the vehicle is set as a value determined by adding the braking-pressure correcting value PY to the ABS pressure $P_{ABS}$. More specifically, when at least the inner wheel is about to be locked, a value provided by correcting the ABS pressure by the correcting value PY determined depending upon the difference between the reference yaw rate $Y_{RW}$ which is the target turning level and the actual yaw rate $Y_W$ which is the actual turning level, is determined as an inner wheel braking pressure. Moreover, because the reference yaw rate is smaller than the actual yaw rate, the correcting value PY is a minus value, and the braking pressure is decreased to a level lower than the ABS pressure. The braking pressure of the left rear wheel brake $B_{RL}$ which is the outer wheel as viewed during turning of the vehicle is set at the ABS pressure when the left rear wheel is about to be locked, and is set at the distribution pressure determined at step S6 in FIG. 3, when the left rear wheel is not about to be locked.

At step N13, to be conducted when the vehicle is in the under-steered state, the braking pressure of the right rear wheel brake $B_{RR}$ which is the brake of the inner wheel during turning of the vehicle is set at the ABS pressure. The braking pressure of the left rear wheel brake $B_{RL}$ which is the brake of the outer wheel during turning of the vehicle is set at the ABS pressure when the left rear wheel is about to be locked, and is set at the distribution pressure when the left rear wheel is not about to be locked.

When it is determined at step N6 that the direction of the reference yaw rate is leftward, i.e., when it is determined that the vehicle is being turned leftwardly, the processing is advanced to step N14. At step N14, it is determined whether the direction of the last reference yaw rate $Y_{RW}$ has been leftward. If the direction of the last reference yaw rate $Y_{RW}$ has been also leftward, the processing is advanced to step N16. On the other hand, if the direction of the last reference yaw rate $Y_{RW}$ has been rightward, the PID calculation at step N5 is cleared at step N15, proceeding to step N16. In other words, if the vehicle is being turned leftwardly, the processing is advanced to step N16.

At step N16, it is determined whether the left rear wheel which is the inner wheel during turning of the vehicle is about to be locked, i.e., whether the antilock brake control of the left rear wheel should be conducted. If the left rear wheel is not about to be locked, i.e., if only the right rear wheel which is the outer wheel during turning of the vehicle is about to be locked, and the antilock brake control of the right rear wheel should be conducted, the processing is advanced to step N17.

At step N17, the braking pressure of the left rear wheel brake $B_{RL}$ which is the brake of the inner wheel during turning of the vehicle is set as a value determined by subtracting the braking-pressure correcting value from the control-start pressure which is the braking pressure at the start of the antilock brake control. In other words, when only the outer wheel during turning of the vehicle is about to be locked, a value provided by correcting the braking pressure for the inner wheel by the correcting value PY determined depending upon the difference between the reference yaw rate $Y_{RW}$ which is the target turning level and the actual yaw rate $Y_W$ which is the actual turning level, is determined as the braking pressure for the inner wheel. In this case, because the vehicle is being turned leftwardly, each of the reference yaw rate $Y_{RW}$ and the actual yaw rate $Y_W$ should show a minus value. When the reference yaw rate $Y_{RW}$ is greater than the actual yaw rate $Y_W$, i.e., in an over-steered state, the correcting value PY is a plus value and hence, the braking pressure of the left rear wheel brake $B_{RL}$ is decreased down to a level lower than the control-start pressure. When the reference yaw rate $Y_{RW}$ is equal to or smaller than the actual yaw rate $Y_W$, i.e., in an under-steered state, the correcting value PY is a minus value and hence, the braking pressure of the left rear wheel brake $B_{RL}$ is increased up to a level higher than the control-start pressure. On the other hand, the braking pressure for the outer wheel which should be subjected to the antilock brake control, i.e., the braking pressure of the right rear wheel brake $B_{RR}$ is set at the ABS pressure.

When it is determined at step N16 that the left rear wheel is about to be locked, i.e., when the antilock brake control of at least the left rear wheel brake $B_{RL}$ which is the inner wheel during turning of the vehicle should be conducted, it is determined at step N18 whether the reference yaw rate>the actual yaw rate. If it is determined that the vehicle is in a state in which the reference yaw rate>the actual yaw rate, i.e., in an over-steered state, the processing is advanced to step N19. On the other hand, if it is determined that the vehicle is in a state in which the reference yaw rate≦the actual yaw rate, i.e., in an under-steered state, the processing is advanced to step N20.

At step N19, to be conducted when the vehicle is in the over-steered state, the braking pressure of the left rear wheel brake $B_{RL}$ which is the brake of the inner wheel during turning of the vehicle is set as a value provided by subtracting the braking-pressure correcting value from the ABS pressure. When at least the inner wheel is about to be locked, a value provided by correcting the ABS pressure by the correcting value PY determined depending upon the difference between the reference yaw rate $Y_{RW}$ which is the target turning level and the actual yaw rate $Y_W$ which is the actual turning level, is determined as the braking pressure for the inner wheel. Moreover, because the reference yaw rate $Y_{RW}$ and the actual yaw rate $Y_W$ are in a relationship of reference yaw rate>actual yaw rate, the correcting value PY is a plus value, and the braking pressure is a value lower than the ABS pressure. The braking pressure of the right rear wheel brake $B_{RR}$ for the outer wheel during turning of the vehicle is set at the ABS pressure when the left rear wheel is about to be locked, and is set at the distribution pressure when the left rear wheel is not about to be locked.

At step N20, to be conducted when the vehicle is in the under-steered state, the braking pressure of the left rear wheel brake $B_{RL}$ which is the brake of the inner wheel during turning of the vehicle is set at the ABS pressure. The braking pressure of the right rear wheel brake $B_{RR}$ for the outer wheel during turning of the vehicle is set at the ABS pressure when the right rear wheel is about to be locked, and is set at the distribution pressure when the right rear wheel is not about to be locked.

The operation of this embodiment will be described below. When the friction coefficients of the road sections, with which the left and right wheels are contacted, are different during braking in the middle of traveling of the vehicle, it is anticipated that a condition is encountered in which the direction of the vehicle's yaw rate does not coincide with the direction of steerage provided by a vehicle driver. Therefore, by comparing the steering direction and the direction of the vehicle's yaw rate with each other, it is possible to determine that the vehicle is in a state in which the friction coefficients of the road sections, with which the left and right wheels are contacted, are different when both of these directions do not coincide with each other. Thus, stability can be insured during braking by selecting a collective control mode in such a state. On the other hand, when the steering direction and the direction of the vehicle's yaw rate coincide with each other, a maximum deceleration can be increased by selecting an individual control mode, in such a manner that a sufficient braking force can be exhibited for the outer wheel for braking force during braking while turning of the vehicle.

Moreover, in conducting the antilock brake control of only the outer wheel during turning of the vehicle with the individual control mode selected, such antilock brake control of the outer wheel is carried out so as to provide a maximum braking force capable of being exhibited for the outer wheel with an increased load. However, for the inner wheel during turning of the vehicle, the braking pressure for the inner wheel at the start of the antilock brake control of the outer wheel is corrected by the correcting value depending upon the difference between the target turning level and the actual turning level. FIG. 7 shows an example of a case where the braking pressures for the outer and inner wheels, the reference yaw rate and the actual yaw rate have been changed in a condition in which a given steering angle and a given brake operation force have been applied. In a period $T_A$ in which there is little difference between the reference yaw rate and the actual yaw rate, the braking pressure for the inner wheel is hardly changed from the control-start pressure. In a period $T_B$ in which the vehicle is in an over-steered state with the actual yaw rate exceeding the reference yaw rate to a relatively large extent, the braking pressure for the inner wheel is decreased from the control-start pressure. In a period $T_C$ in which the vehicle is an under-steered state with the actual yaw rate being relatively largely lower than the reference yaw rate, the braking pressure for the inner wheel is increased. In period $T_E$ in which the vehicle has again reached an under-steered state with the actual yaw rate being relatively largely lower than the reference yaw rate after a lapse of a period $T_D$ in which there is hardly any difference between the reference yaw rate and the actual yaw rate, the braking pressure for the inner wheel is increased, wherein the maximum pressure at this time is a maximum value determined by usual antilock brake control.

Further, in conducting the antilock brake control of at least the inner wheel during braking during turning of the vehicle with the individual control mode selected, the braking pressure for the outer wheel is controlled so that it becomes the ABS pressure or the distribution pressure depending upon whether or not the outer wheel tends to be locked, but the braking pressure for the inner wheel determined by the antilock brake control, when in the over-steered state, is corrected in a decreased manner by the correcting value PY depending upon the difference between the target turning level and the actual turning level.

By correcting the braking pressure for the inner wheel by the correcting value PY depending upon the difference between the target turning level and the actual turning level during braking during turning of the vehicle in the above manner, the control of turning level can be performed for the inner wheel with a decreased load to enhance the turning characteristic of the vehicle.

The actual yaw rate $Y_W$ which is the actual turning level may be directly detected by a yaw rate sensor in place of the determination by the calculation.

Although the embodiment of the present invention has been described in detail, it will be understood that the present invention is not limited to the above-described embodiment, and various modifications in design may be made without departing from the spirit and scope of the invention defined in the claims.

What is claimed is:

1. An antilock brake control process for a vehicle, for individually detecting a locking tendency in a left wheel and a right wheel during braking, and individually regulating braking forces of a left wheel brake and a right wheel brake in accordance with a detected locking tendency in the respective wheels, wherein said process comprising the steps of:

detecting a steering angle, a vehicle speed and a yaw rate of the vehicle;

determining a reference yaw rate based on the steering angle and the vehicle speed; and when a locking tendency is detected only in an outer wheel of the left and right wheels during turning of the vehicle, regulating the braking force for said outer wheel in accordance with the locking tendency of said outer wheel, and regulating the braking force for an inner wheel during turning of the vehicle in accordance with a difference between said reference yaw rate and the detected actual yaw rate.

2. An antilock brake control process for a vehicle, for individually detecting a locking tendency in a left wheel and a right wheel during braking, and individually regulating braking forces of a left wheel brake and a right wheel brake in accordance with a detected locking tendency in the respective wheels, wherein said process comprising the steps of:

detecting a steering angle, a vehicle speed and a yaw rate of the vehicle;

determining a reference yaw rate based on the steering angle and the vehicle speed; and in an over-steered state, when a locking tendency is detected at least in an inner wheel of the left and right wheels during turning of the vehicle, regulating the braking force for an outer wheel depending upon whether or not there is a locking tendency in the outer wheel, and regulating the braking pressure for said inner wheel to a value lower than a value determined by an antilock brake control in accordance with a difference between said reference yaw rate and the detected actual yaw rate.

* * * * *